(12) United States Patent
Simonette et al.

(10) Patent No.: US 10,727,783 B2
(45) Date of Patent: Jul. 28, 2020

(54) HELIOSTAT CLEANING TOOL AND METHOD

(71) Applicant: Dynamis Solutions, Inc., Las Vegas, NV (US)

(72) Inventors: Dallas Simonette, Las Vegas, NV (US); Houston Simonette, Las Vegas, NV (US)

(73) Assignee: Dynamis Solutions, Inc., Las Vegas, NV (US)

( * ) Notice: Subject to any disclaimer, the term of this patent is extended or adjusted under 35 U.S.C. 154(b) by 116 days.

(21) Appl. No.: 15/648,709

(22) Filed: Jul. 13, 2017

(65) Prior Publication Data

US 2018/0287553 A1    Oct. 4, 2018

Related U.S. Application Data

(60) Provisional application No. 62/362,655, filed on Jul. 15, 2016.

(51) Int. Cl.
| | |
|---|---|
| *A47L 13/11* | (2006.01) |
| *F24S 40/20* | (2018.01) |
| *H02S 40/10* | (2014.01) |
| *B08B 3/04* | (2006.01) |
| *B08B 1/00* | (2006.01) |
| *H02S 40/22* | (2014.01) |

(52) U.S. Cl.
CPC ............ *H02S 40/10* (2014.12); *A47L 13/11* (2013.01); *B08B 1/005* (2013.01); *B08B 3/04* (2013.01); *F24S 40/20* (2018.05); *H02S 40/22* (2014.12)

(58) Field of Classification Search
CPC .. A47L 1/06; A47L 13/11; H02S 40/10; F24S 40/20
See application file for complete search history.

(56) References Cited

U.S. PATENT DOCUMENTS

| | | | | |
|---|---|---|---|---|
| 5,255,405 | A * | 10/1993 | Samuelsson | A47L 1/06 116/110 |
| 5,862,562 | A * | 1/1999 | Erken | A47L 1/06 15/117 |
| 8,726,458 | B1 | 5/2014 | Mahr et al. | |
| 2002/0078519 | A1* | 6/2002 | Boothby | A47L 1/06 15/121 |
| 2013/0047358 | A1* | 2/2013 | Shafer | A46B 11/0017 15/114 |

FOREIGN PATENT DOCUMENTS

GB     1 313 107     * 4/1973

* cited by examiner

*Primary Examiner* — Randall E Chin
(74) *Attorney, Agent, or Firm* — Dicke, Billig & Czaja, PLLC

(57) ABSTRACT

A mechanical device for cleaning a reflective glass surface is described. In one example, the glass surface is a heliostat mirror. The device includes a cleaning head and a blade assembly. In one example, the cleaning head includes an elongated base member and having a cleaning pad. The cleaning blade assembly includes a cleaning blade. The blade is mounted to the base member and is moveable between a first engaged position that causes the blade of the blade assembly to come into contact with the reflective glass surface and a second disengaged position that causes the blade of the blade assembly to come out of contact with the glass surface. A method of cleaning a glass surface is also disclosed.

13 Claims, 13 Drawing Sheets

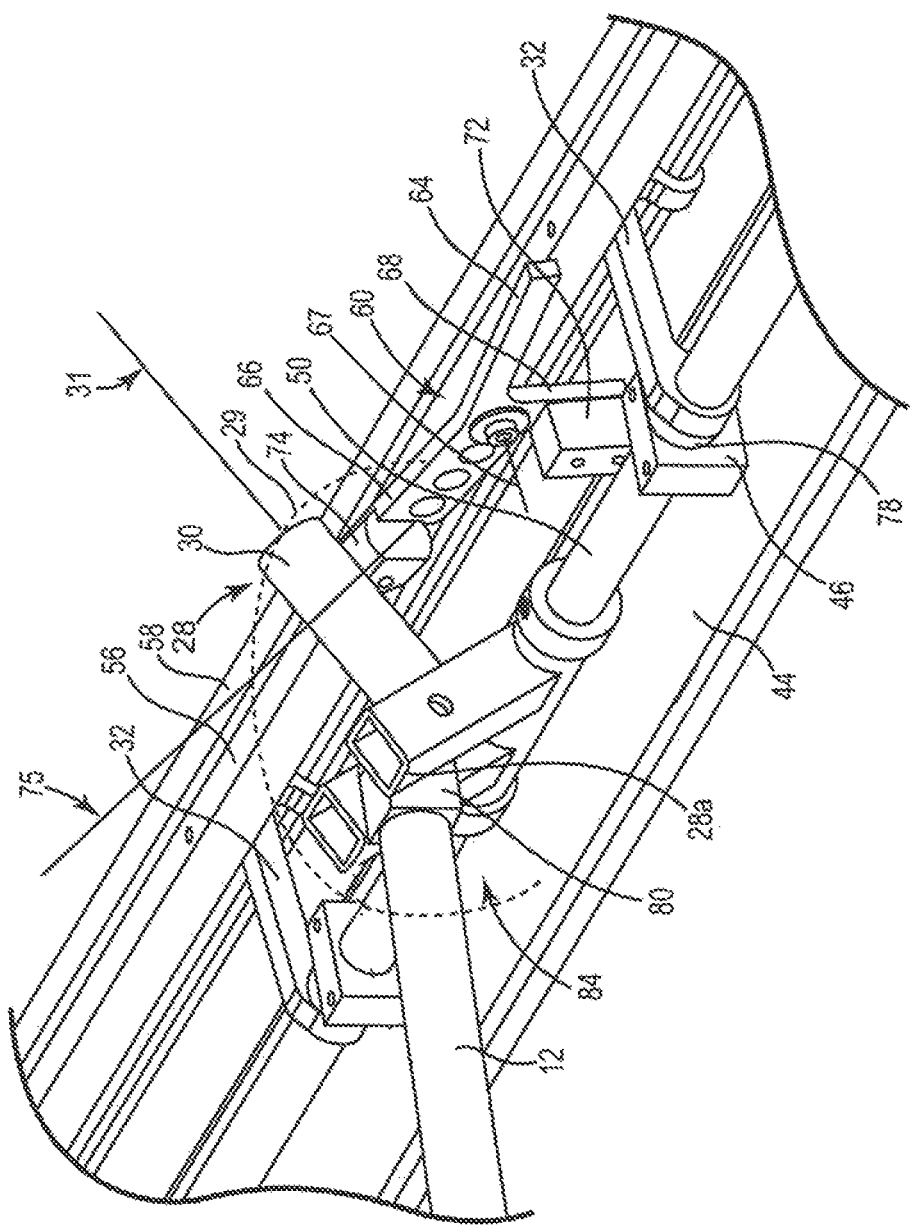

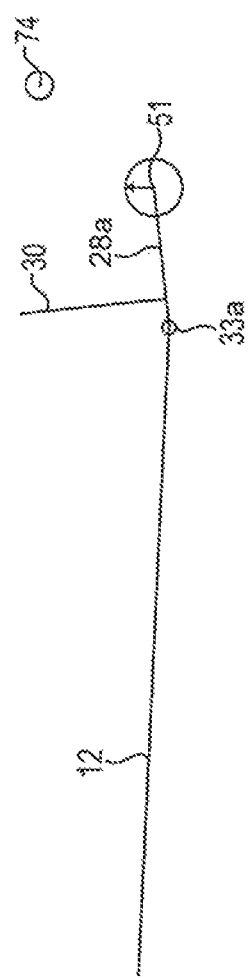
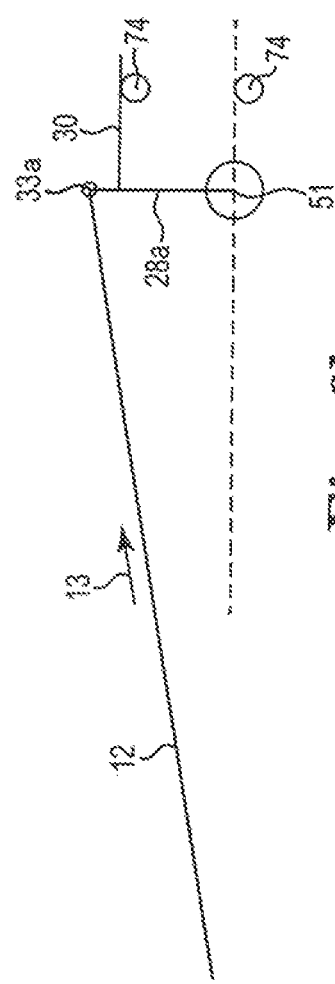

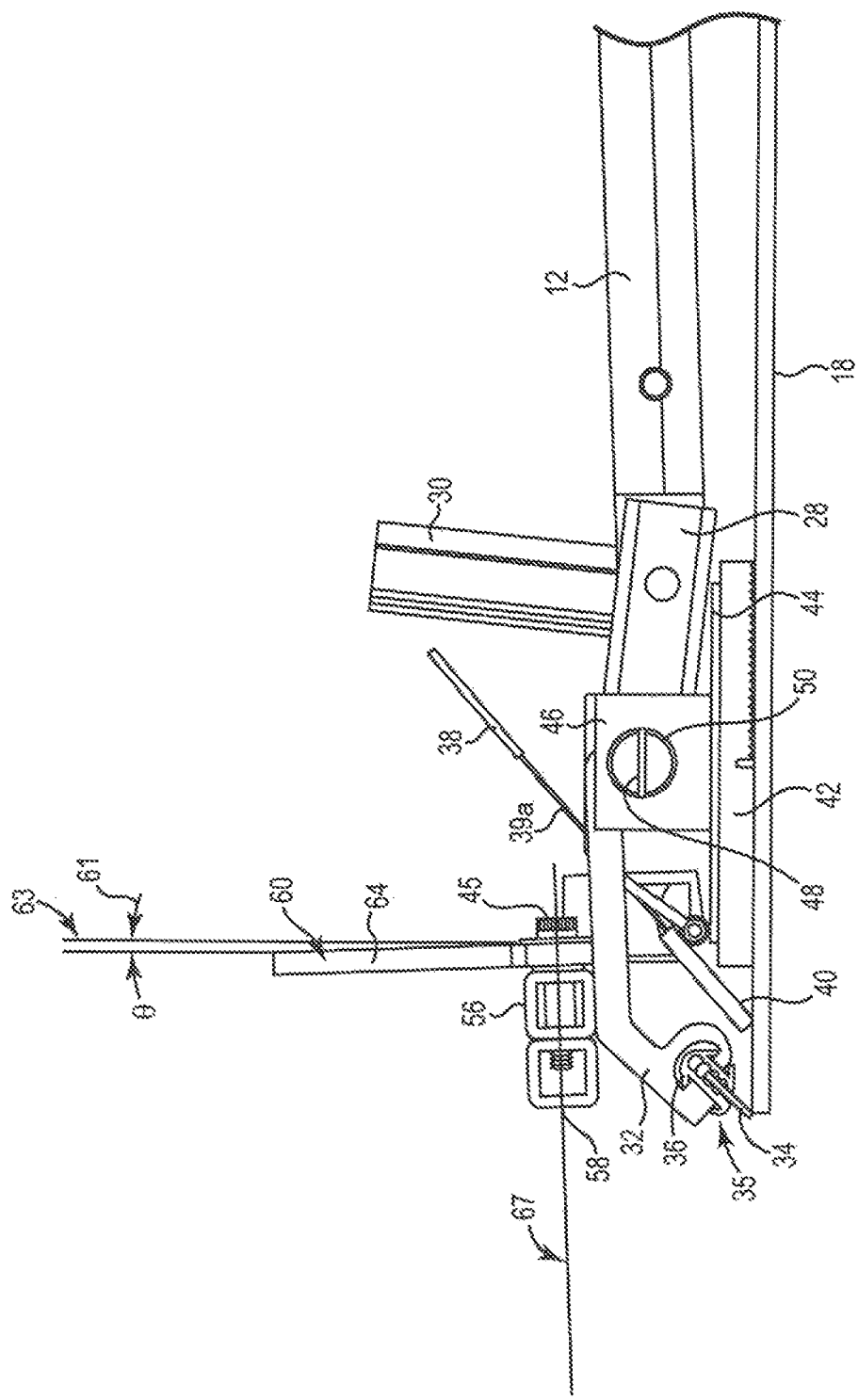

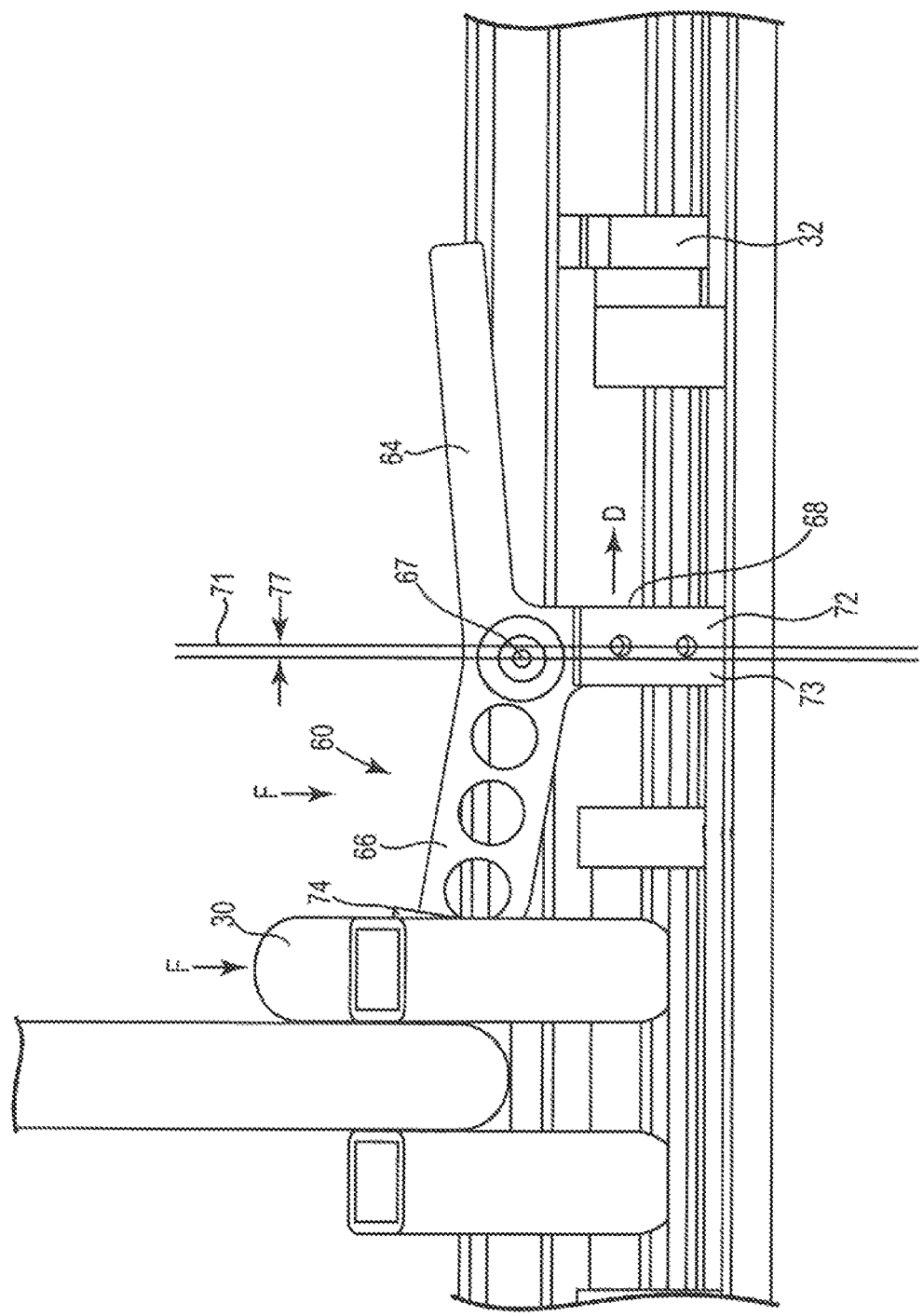

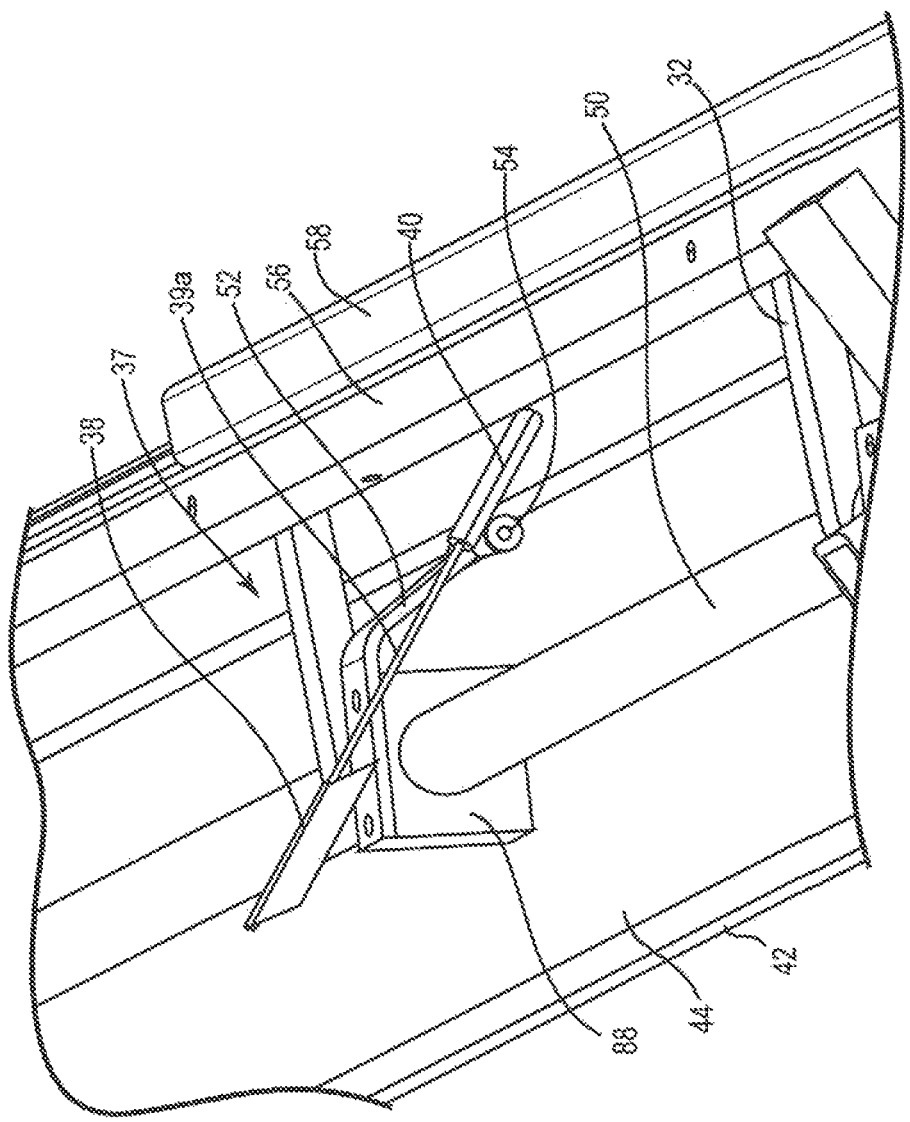

HELIOSTAT CLEANING TOOL AND METHOD

CROSS-REFERENCE TO RELATED APPLICATIONS

This Utility patent application is a non-provisional application of U.S. Ser. No. 62/362,655, filed Jul. 15, 2016, which is incorporated herein by reference.

BACKGROUND

The present invention relates to tools for cleaning substantially flat, smooth surfaces. In particular the present invention relates to cleaning reflective mirrors of a heliostat used in concentrated solar field applications.

The operating efficiency of concentrated solar fields that utilize heliostats to collect solar energy is highly dependent upon the reflectivity of the glass mirrors. A small amount of dust, dirt or debris on the glass can reduce the output of the solar field by a significant amount. For this reason, a great deal of effort has gone into developing cleaning systems and devices for improving the reflectivity of the mirrors. For example, U.S. Pat. No. 8,726,458 describes a portable cleaning device that is driven down the rows of mirrors. Telescoping arms that support cleaning heads contact the mirrors to clean them.

Wet cleaning system such as the system disclosed in U.S. Pat. No. 8,726,458 have disadvantages. The amount of water needed to clean the glass is approximately 2 gallons per mirror, for an average size mirror of 5 feet×8 feet. In the desert areas where many solar fields are built, this amount of water causes the vegetation to overgrow, adding maintenance expense to the operation of the field. In addition, the use of cleaning chemicals and high volumes of water may have a negative environmental impact, which could lead to fines, temporary shut downs and even plant closures. Last, these systems may not clean all of the glass evenly, and the plants may not be designed so that these tractor systems can maneuver without colliding with and breaking the glass. When the tractors are driven manually, operator error can lead to further glass damage.

It would be desirable to develop a cleaning tool that uses only a small volume of pure water, and no chemicals, that restores the reflectivity of the glass to an acceptable level, such that the power plant can operate efficiently, while using the tool has a negligible environmental impact.

SUMMARY

The present invention is a mechanical tool capable of cleaning smooth surfaces, such as glass. In particular, tools of the present invention are particularly useful in cleaning reflective glass panels of the type used in concentrated solar fields. The structures that support the reflective glass panels as well as the glass panels themselves are referred to in the industry as heliostats. Heliostats typically rotate about a vertical axis, as well as a second axis parallel to the ground. They include drive systems for rotating about two separate axes and computer programs control the heliostats to follow the sun and reflect as much radiation as possible.

Tools of the present invention include a unique cleaning head that include an elongated base member, which in some embodiments is substantially flat, and slightly longer than the width of the reflective glass panel. The cleaning head has a first surface configured to support a cleaning pad. The first surface may be defined as a bottom surface of the tool. The cleaning pad may be held to a lower flat surface of the base member by an attachment device such as a plurality of Velcro hook and loop closure patches or by other means for attaching a flexible, textile pad to a rigid support structure. For example, the textile pad could contain tabs extending outwardly from the edges of the pad, with grommets that are placed through a hinged pin on the upper surface. After the pins are placed through the grommets, the pin may be rotated to lock the pad into place.

The head includes an articulating cleaning blade assembly comprising a cleaning blade that is pivotally mounted to the base member and positioned proximate an edge of the elongated base member and moveable between a first engaged position that causes the blade of the blade assembly to come into contact with the reflective glass surface and a second disengaged position that causes the blade of the blade assembly to come out of contact with the glass surface. When the head is traveling away from the operator, the blade is disengaged, and when the head is traveling toward the operator, the blade is engaged.

The present invention includes an actuator mounted to the base and configured to cause the cleaning blade to rotate into the engaged position. In some embodiments, the actuator comprises a latch release arm that contacts a latch assembly which causes the blade to come into contact with the surface to be cleaned.

The present invention is also a method of cleaning a glass surface of a glass panel having an upper and a lower edge. The glass panel may also have first and second opposite sides. According to the method of the present invention, the glass surface is first moved into a position that enables cleaning. Examples of suitable cleaning positions include rotating the glass surface so that it is in a plane that is positioned at an angle with respect to the horizontal of between 35 and 55 degrees. Upper and lower edges of the glass surface remain parallel to the ground in some embodiments. The method comprises providing a cleaning tool having a cleaning head for supporting a cleaning pad, an articulating cleaning blade and an actuator for moving the cleaning blade into a glass contacting position and a release mechanism for moving the cleaning blade into a glass disengaged position.

The method includes the step of placing a cleaning head on the glass surface proximate a lower edge. Preferably a long side of the cleaning head is placed on the glass surface at the lower edge of the glass. According to the method, the cleaning blade must be disengaged before placement on the glass surface, or disengaged once placed on the glass surface. According to the method, a small quantity of water is applied to the glass surface above the cleaning blade. Preferably enough water to saturate the pad is all that is needed. The cleaning head is moved towards the top edge, wherein the cleaning pad absorbs the applied water and acts upon the dirt on the surface, until the blade reaches the top edge.

When the cleaning head is at the top edge of the glass surface, the cleaning blade into an engaged position. In some embodiments, the cleaning blade is a rigid frame with a flexible blade extending out of the frame along the length of the blade to form a squeegee. Next, the head is moved towards the lower edge. The cleaning blade is engaged, and in some embodiments weights affixed to the cleaning blade support structure apply added forces on the glass surface, causing removal of debris and removing moisture from the surface.

The close spacing between the pad and the blade insures that the glass surface is still wet so that the blade has the proper amount of moisture to clean the surface and remove all of the debris and water.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 5 is a detailed perspective view of an exemplary cleaning head assembly just prior to movement of the articulating cleaning blade assembly into the engaged position.

FIGS. 6a and 6b are schematic diagrams showing how the pole is used to actuate the handle pivot assembly of one embodiment.

FIG. 7 is a side elevational view of an example of a cleaning head, with the blade 35 in the engaged position.

FIG. 8 is an expanded view of an example of a latch assembly of an embodiment.

FIG. 9 is an expanded perspective view of the flag assembly and mounting structure of an example of the invention.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
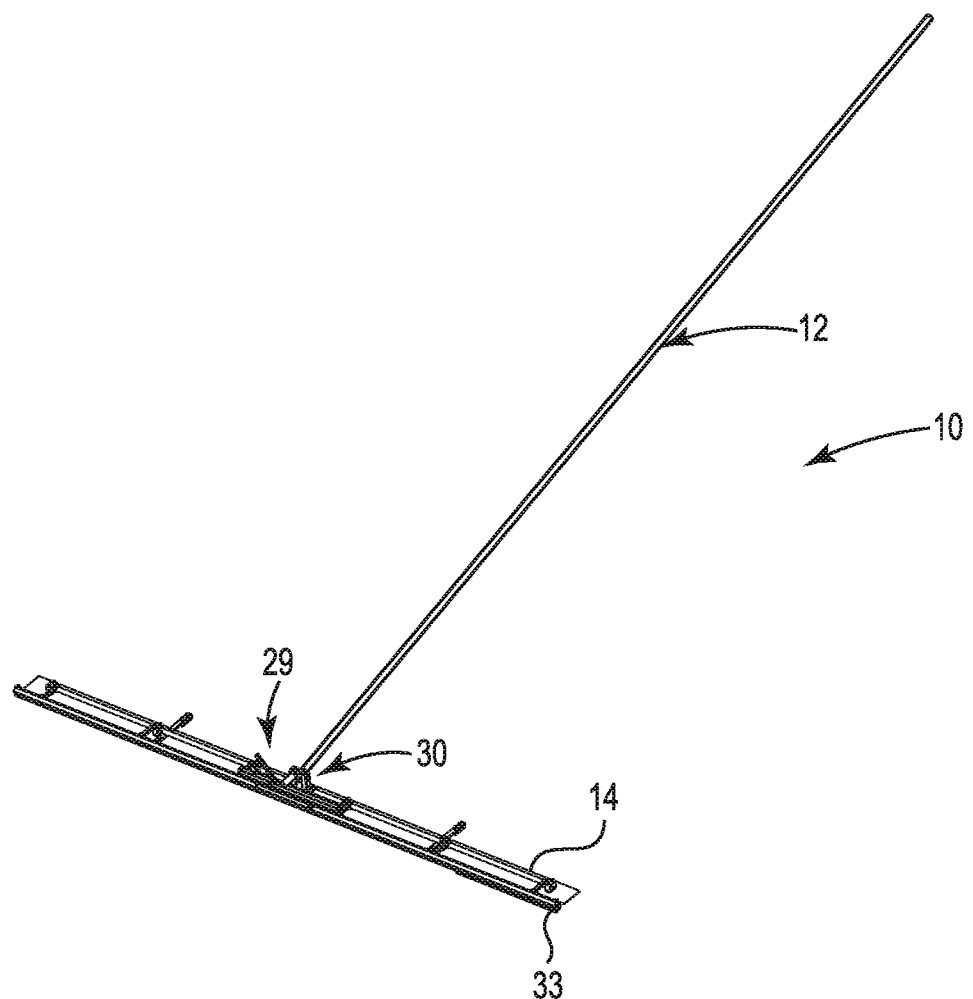
FIG. 1 is a perspective view of a heliostat cleaning device of the present invention.

The present invention, an example of which is illustrated in FIG. 1, is a unique cleaning device suitable for cleaning the reflective panels of heliostats in concentrated solar fields, and for cleaning other flat, smooth surfaces that can be positioned at an angle with respect to the vertical. For purposes of this disclosure, reflective panels and mirror panels have the same meaning. Glass panels may or may not include a mirror feature.

The device as shown generally in FIG. 1 includes a unique cleaning head 14. The cleaning head 14 includes an articulating cleaning blade assembly 33. Also included is an actuator assembly 29 comprising a latch release arm 30 that enables a user to control the cleaning head 14 distally and from the ground. A pole 12 is provided for the user to manipulate the cleaning head from a distal location. The cleaning head 14 may be placed horizontally at the bottom edge of a glass panel. In a first phase of cleaning, a small quantity of water such as 8-20 liquid ounces, for example is poured across the width of the glass above the cleaning head 14. The cleaning head is moved in the first phase of cleaning the panel from the lower edge of the glass panel to the top edge with the articulated cleaning blade assembly in the disengaged positioned and spaced above the surface to be cleaned.

When the cleaning head 14 reaches the top edge of the reflective panel, the articulated cleaning blade assembly is moved to an engaged position, and the cleaning head 14 is then moved in a second phase of cleaning in an opposite direction towards the lower edge of the reflective panel. When the head 14 reaches the bottom edge, the device is manually grasped, moved off of the edge and the device 10 is positioned along the bottom edge of the next reflective panel. Before or after the device 10 is moved to the next panel to be cleaned, the articulating cleaning blade assembly is returned to a retracted, disengaged position to ready the device for a next cleaning cycle.

This two-step process cleans and dries the face of the reflective panel, restoring the reflectivity of the panel from a reflectivity of 88 percent or lower to an acceptable level, such as 90-95% reflectivity, for example.

Figure 2:
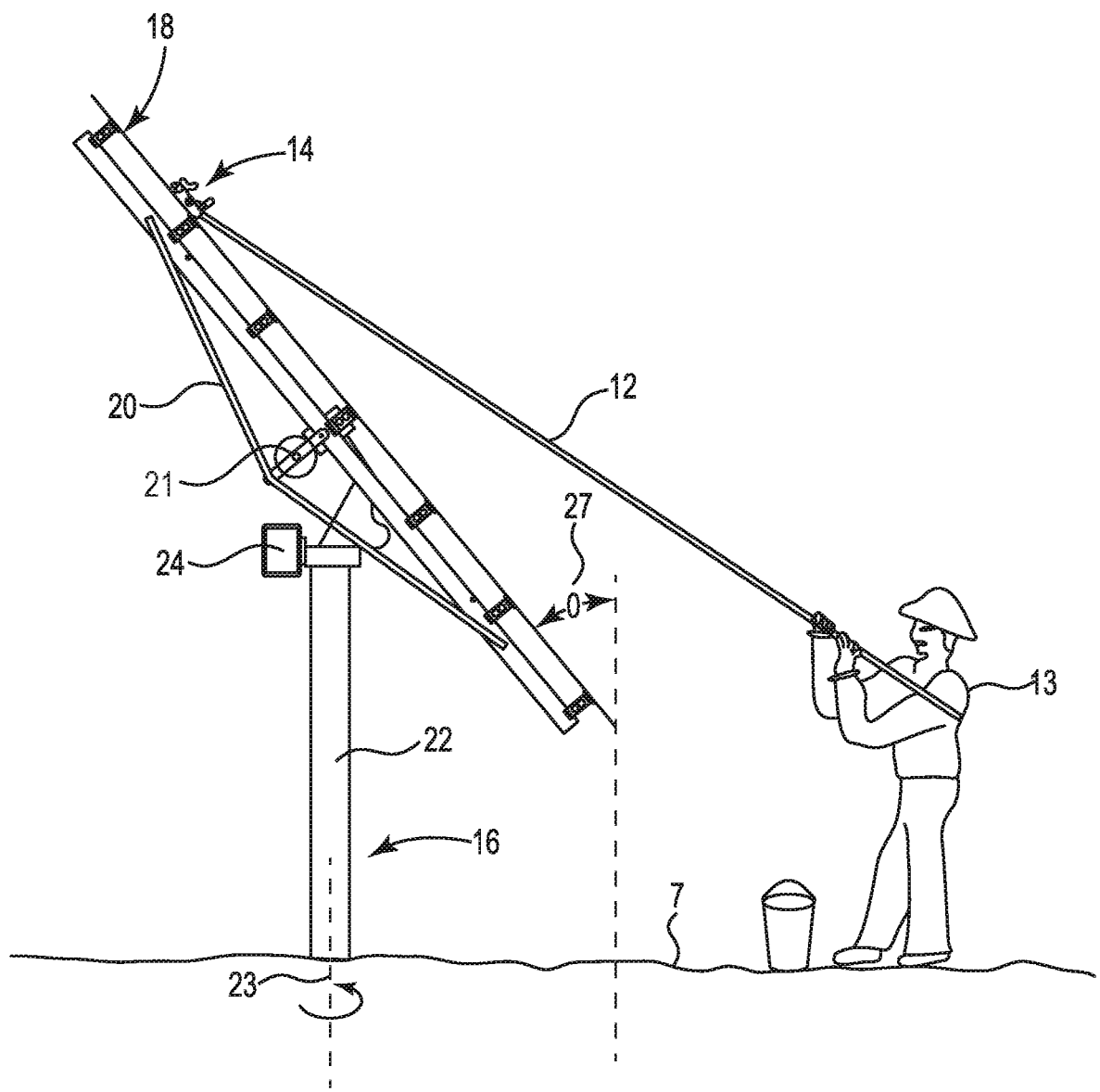
FIG. 2 shows an exemplary tool of the present invention being operated by a worker from the ground.

As shown in FIG. 2, the pole 12 can be manipulated by a user 13 to clean a heliostat 16 from the ground 17. A typical heliostat 16 includes a substantially vertical pylon 22. The heliostat rotates about central axis 23 of the pylon. The heliostat 16 also has a reflector support assembly 20, and two substantially rectangular and substantially flat mirrors 18 mounted to the support assembly 20. The support assembly is rotatable about a horizontal axis 21, which enables the mirrors 18 to rotate to an angle 27 with respect to the vertical of between 35 and 55 degrees. Although it is possible to clean the glass surfaces when they are in a horizontal or vertical position, cleaning may be done more efficiently at the stated range of exemplary angles. For example, when the support assembly 20 is rotated to position the glass surfaces in a substantially horizontal position, a worker 13 would need to operate the tool 10 off of a lift, ladder or platform. If the support assembly is rotated to a substantially vertical position, the worker 13 would need to support the entire weight of the tool during cleaning operations, and there would be less of a cleaning force applied to the surface to be cleaned.

Depending on the size of the glass panel to be cleaned, one or two workers are needed to operate the tool due to the weight and size of the tool, especially when the cleaning pad is saturated with water, adding weight to the tool. A typical reflective glass panel ranges in width between 3 and 10 feet and in height (length) between 4 and 12 feet.

Figure 3:
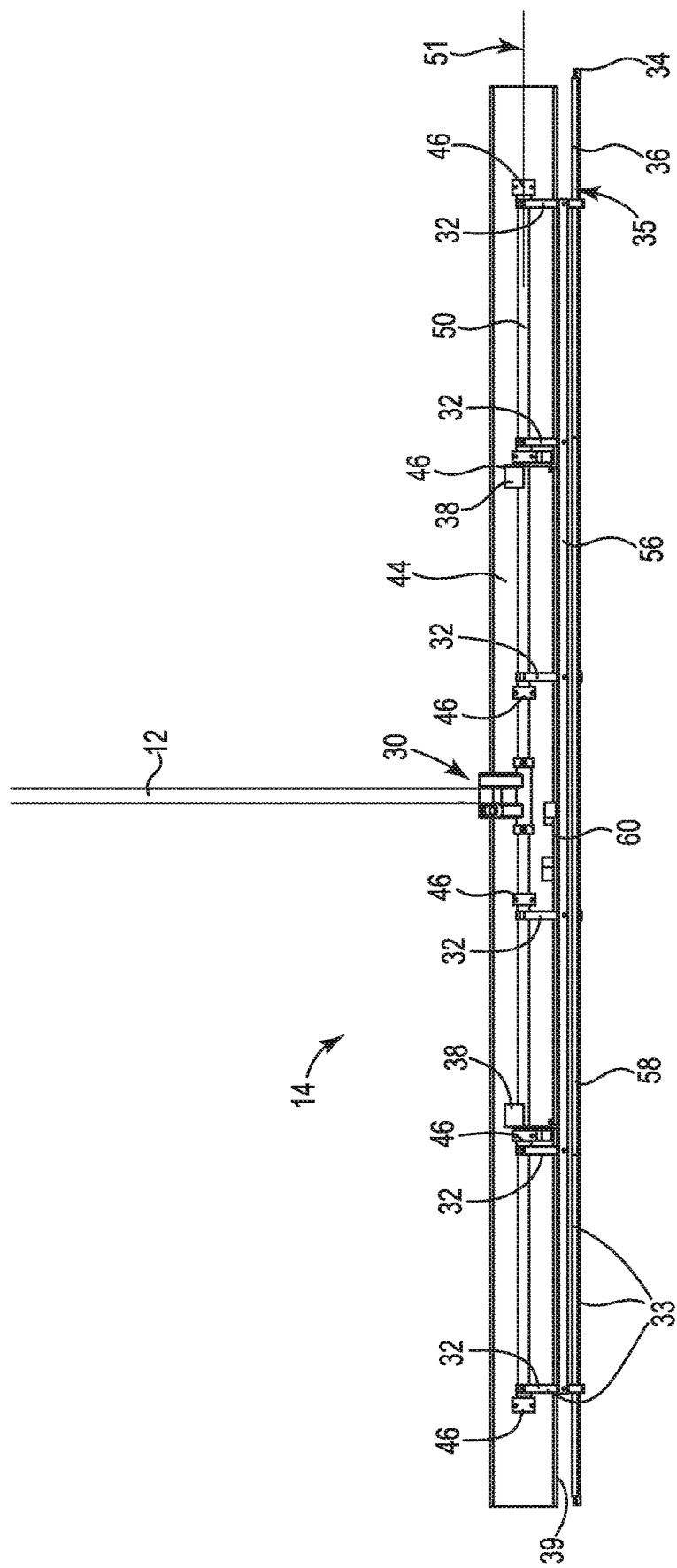
FIG. 3 is a top plan view of a cleaning head assembly of an example of the present invention.

FIG. 3 is a top plan view of a cleaning head of the present invention. The cleaning head includes a base 44, which in an embodiment is formed from a sheet of solid magnesium or aluminum alloy of a thickness between about ⅛ to ¼ inches. The base 44 is long enough to span a width of the reflective panel and in some embodiments exceeds the width of the reflective panel being cleaned. In other embodiments, the sheet of magnesium alloy or aluminum is perforated to reduce its weight.

The cleaning head 14 comprises an articulating cleaning blade assembly 33 comprising a cleaning blade 35 that is pivotally mounted to the base member and positioned proximate an edge 39 of the elongated base member 44 and moveable between a first engaged position that causes the blade of the blade assembly to come into contact with the reflective glass surface and a second disengaged position that causes the blade of the blade assembly to come out of contact with the glass surface. Although in the present example the blade assembly rotates in and out of engagement, in other embodiments, the blade can instead raise and lower linearly. The cleaning blade assembly 33 supports a cleaning blade 35 which in an example of the invention includes a rigid, elongated squeegee channel 36 that is structural and retains a portion of a squeegee blade 34 such that another portion protrudes from a longitudinal opening in the channel 36 along the length of the blade 35. The blade is attached to the cleaning head by means of a plurality of rocker arms 32. Each rocker arm has an upper surface for receiving at least one weight 56. A second weight 58 is desirable to increase a force applied by the blade 35 to the surface to be cleaned, as will be described in more detail below.

Figure 4:
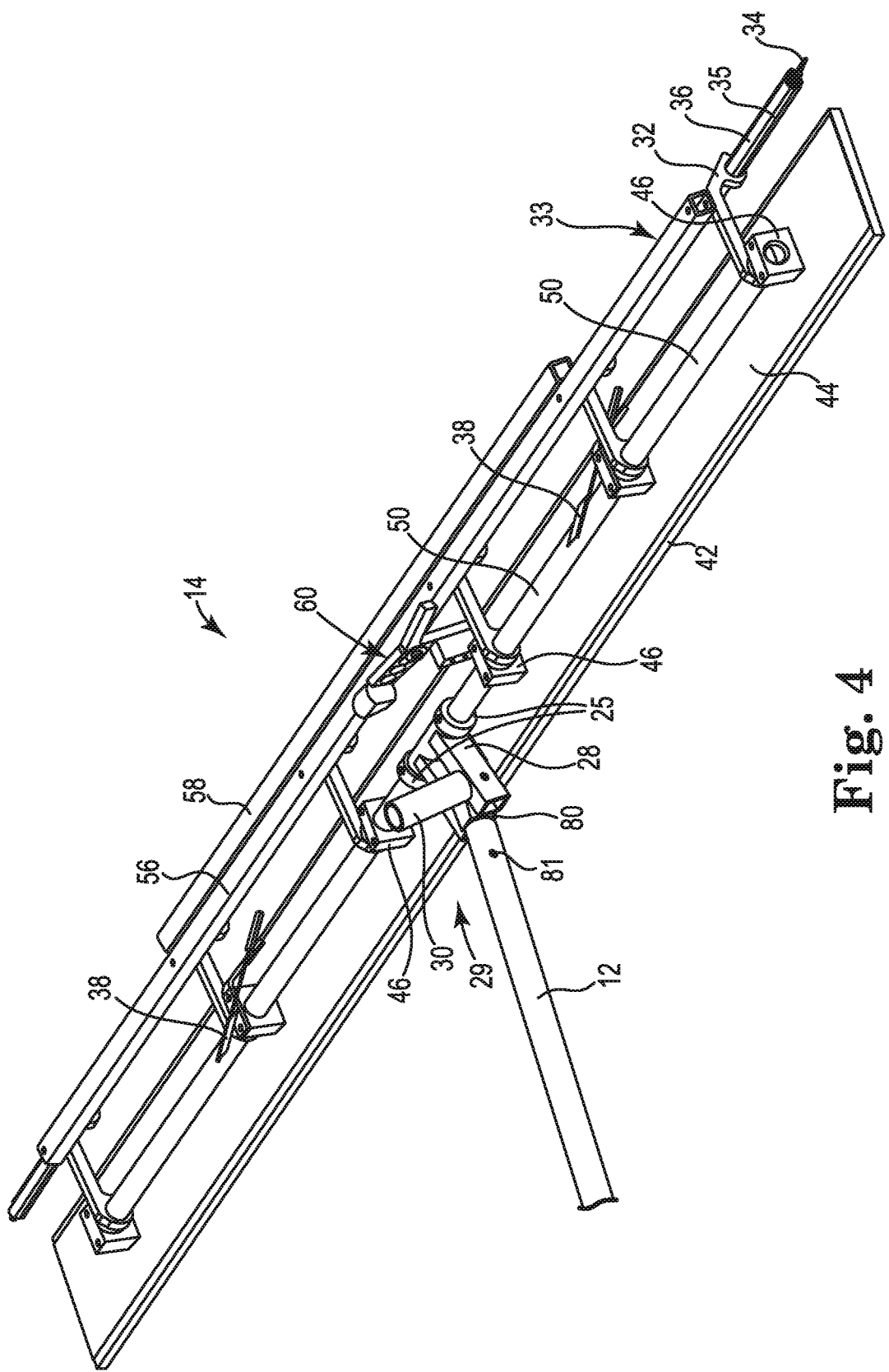
FIG. 4 is a perspective view of a cleaning head assembly of an example of the present invention with the articulating cleaning blade assembly in the disengaged position.

As shown in FIG. 4, each rocker arm 32 has a cylindrical aperture. The rocker arm apertures are positioned over a cylindrical pivot tube 50 that is pivotally mounted to the base using multiple pivot tube mounts 46. The articulating cleaning blade assembly 33 is configured for pivotal movement along a central pivot tube axis 51 (shown in FIG. 3) from a disengaged position to an engaged position. In the first disengaged position, the blade does not contact the surface to be cleaned, while in the second engaged position, the blade is in contact with the surface to be cleaned.

In FIG. 4, the articulating cleaning blade assembly 33 is shown in the disengaged position. First and second weights 56 and 58 mounted proximate a distal end of each rocker arm 32 add additional downward forces onto the cleaning blade 35 in the engaged position, and also facilitate the movement of the articulated cleaning blade assembly 33 into an engaged position.

The present invention further comprises an actuator pivot assembly 29. The pivot assembly 29 includes a handle pivot assembly 28 that is mounted for rotation about pivot tube 50. The pivot assembly 28 includes lock collars 25 which lock onto the pivot tube 50. Lock collars 25 keep the handle pivot assembly 28 centered on the pivot tube 50. The handle pivot assembly 28 is mounted to the base 44 with pivot tube mounts 46 and is configured upon actuation to cause latch release arm 30 to contact latch assembly 60 to in turn move the cleaning blade 35 to rotate into the engaged position. The pole 12 is connected to the actuator pivot assembly 29 by means of a handle adaptor 80. The pole is secured to the handle adaptor by means of a detent 81, pin or other suitable structure. The handle adaptor 80 is pivotally attached to a handle pivot assembly 28 which is shown in greater detail in FIG. 5. The handle pivot assembly 28 includes a latch release arm 30 that when a force is applied in direction 84 rotates the latch release arm 30 into contact with latch assembly 60. Latch assembly 60 is shown in the disengaged position, just prior to an application of a force to cause the actuator arm 66 to pivot through pivotal axis 67 downwardly until a lower surface of transition block 74 contacts an upper surface of the base 44. Latch assembly 60 is pivotally attached to the articulating blade assembly 33 through a pin located about pivotal axis 67. A bolt or any other suitable device that permits the latch assembly 60 to pivot freely about axis 67 while being fixedly attached to the articulating blade assembly 33 can be used for this purpose.

The latch assembly 60 in one embodiment is generally "T" shaped structure with an actuator arm 66, a reset lever 64, a lock arm 68, a lock bearing block 72 at a distal end of the actuator arm 66 and a transition block 74 at a distal end of lock arm 68 that cooperates with the latch release arm 30. It has been discovered that by providing a smooth cylindrical surface on latch release arm 30, and a smooth, curved upper surface on transition block 74, the articulating cleaning blade assembly 33 lowers into position smoothly and without an abrupt drop, which is important for protecting the glass from being damaged, or damaging the tool itself. In particular, the top surface of transition block 74 should have a cylindrical curve along an axis 75 that is substantially perpendicular to the axis 31 of the latch release arm 30 when the two surfaces come into contact. As the arm 66 drops, latch release arm 30 comes into contact with weights 56, 58. After the cleaning blade 35 (see FIG. 3) is in the engaged position, the release arm 30 may be removed without changing the position of cleaning blade 35. In other words, latch release arm 30 assists in delivering the cleaning blade 35 to the engaged position, but it does not cause the blade to be retained in that position.

A simplified drawing demonstrating the pivotal action of the handle pivot assembly 28 and pole 12 (shown as a line) is shown in FIGS. 6a and 6b. When the pole 12 is not being operated to engage the cleaning blade 35, the pole 12 is in or near linear alignment with the side 28a of handle pivot assembly 28. In one embodiment as shown in FIG. 6a, the distal end of pole 12 is beneath the axis 51 of pivot tube 50. When the latch release arm 30 points upwardly, as shown in FIG. 6a, it is out of contact with transition block 74. When the operator wants to engage the cleaning blade 35, the distal end of the pole 12 is lifted, and then the pole is pushed in the direction of arrow 13 as shown in FIG. 6b. The distal end is lifted and the force causes pivot assembly 28 to pivot about axis 51 central to the pivot tube. The latch release arm 30 rotates clockwise in direction 31 about pivot 33a until arm 30 contacts transition block 74, and lowers the transition block until the block tips past its center of gravity and drops to the upper surface of the base 44.

As shown in greater detail in FIG. 7, the latch assembly 60 is attached to the articulating cleaning blade assembly 33 (shown in FIG. 3) by a pin 45 extending through apertures on opposite sides of weights 56 and 58 which are in turn secured to a distal end of rocker arms 32 by conventional means such as welding, screws, nuts and bolts or other types of fasteners. The pin secures the weights to the latch assembly 60, but permits latch assembly 60 to rotate freely about axis 67. In this Figure, the latch assembly 60 is in the engaged position. Reset lever 64 is in the up position, actuator arm 66 (shown in FIG. 8) is in the down position, and the cleaning blade 35 is in the engaged position, putting squeegee blade 34 in contact with the upper surface of reflective glass panel 18. Rocker arms 32 are rotated to the low position. The cross-sectional shape of an exemplary longitudinal squeegee channel 36 can be seen in greater detail in this Figure, as well as a cross-sectional view of the squeegee blade 34. The channel may be formed of any rigid structural material, but in one example, the channel is formed from aluminum, and the squeegee blade is extruded from natural rubber or other flexible material that is capable of conforming to the surface of the glass and applying a force to the glass to remove a majority of the water used to clean the glass.

In some applications, the reflective glass panels 18 have a desirable slight curvature. For this reason, it is desirable to use a cleaning pad 42 and a squeegee blade 34 that are sufficiently pliable to account for slight deviations from the surface being completely flat.

Referring to FIG. 8, the latch assembly 60 is shown with a portion of pivot tube 50 removed for greater clarity. Latch assembly 60 pivots about pivot 67. Pivot axis 67 is central to pivot 72a. The axis 67 of this pivot 72a is spaced apart horizontally from a vertical centerline 71 of lock bearing block 72, by a distance 77 sufficient to reduce the downward forces needed to move transition block 74 (shown more clearly in FIG. 11) to the disengaged position. In one example, this distance is between ⅛ and ½ of an inch, with an exemplary gap of ¼ inch. As a downward force F is applied to the transition block 74 by latch release arm 30, the lock bearing block 72 rotates in direction D until a trailing edge 73 of the block rests on the base. This trailing edge 73 is rounded so that the cleaning blade 35 lowers smoothly onto the glass surface and the transition between the two positions is smoother. After rotation, the distance between pivot axis 67 and the top surface of the base 44 is reduced. In some embodiments, the lower surface (not shown) of lock bearing block 72 is tapered toward the direction of the cleaning blade 35 if the block 72 does not sit perpendicular to the upper surface of the base 44. In one embodiment, (FIG. 7) the latch assembly structure is positioned at a slight angle 61 with respect to a line 63 perpendicular to the plane of the base 44.

Referring back to FIG. 7, in some forms of the invention, the weights 56, 58 are positioned near the distal end of the rocker arms 32 that support the cleaning blade 35. The weights 56, 58 may be formed of linear lengths of square tubing, solid square stock, angle iron or other structural metal and may be formed of carbon steel, aluminum, stainless steel or any other material that adds enough weight to assist in rotating the blade assembly 33 into an engaged position, but is light enough for an operator of the tool to lift and move the tool from glass panel to glass panel. In other forms of the invention, the weights can be formed into the shape of a handle.

In one form of the invention, as shown in FIG. 9, a flag assembly 37 is provided that comprises a flag 38, and elongated shaft 39a and a counterweight 40, pivotally mounted to a flag mount 52, that provides a visual indication to the operator of the tool that the head 14 has reached the top edge of the glass panel during the first phase of cleaning in which the cleaning head is moving upwards towards the upper edge of the glass panel. The counterweight 40 is provided to rotate the shaft 39a about pivot 54 to raise the flag when the counterweight protrudes over the top edge of the panel. The flag 38 is attached to the pivot 54 along an exterior surface of the counterweight in one embodiment. As discussed earlier, when the cleaning head 14 is moving upwards towards the top edge of the glass panel 18 in the first phase of cleaning, the blade assembly 33 is disengaged.

Figure 10:
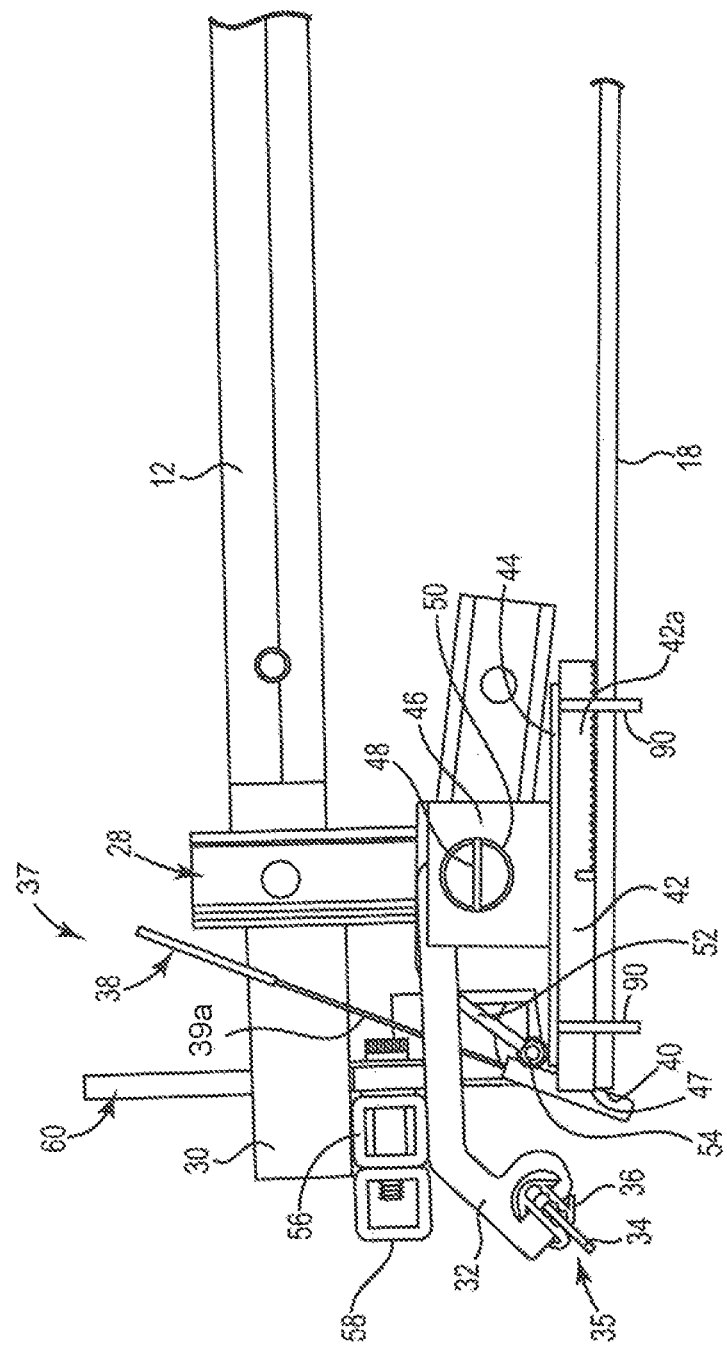
FIG. 10 is a side elevational view of an example of a cleaning head.

As shown in FIG. 10, when the base 44 holding the pad 42 reaches the end 47 of the glass, counterweight 40 pivots about pivot 54, and a lower end of the counterweight 40 drops below the glass surface, raising the flag 38 into an up position viewable by the operator, indicating the device is ready for the second phase of cleaning. In one form of the invention, multiple flag assemblies 37 are provided on the device. Each flag assembly 37 further comprises an angled flag mount 52 comprising an elongated arm that is angled towards the upper surface of the base 44. A bushing is provided that is mounted to an upper surface of the base 44, and one end of the flag mount 52 is mounted to the bushing. At the opposite end of the flag mount 52 is the pivot 54 for causing rotation of the counterweight 40, shaft 39 and flag 38. As each counterweight 40 moves below the upper surface of the glass panel, as shown in FIG. 10, the flags are simultaneously raised to a position where the flag is clearly viewable by the operator. When this visual indication is present, the operator actuates the handle pivot assembly by pushing the pole 12 upward to cause the latch assembly to rotate and lower the cleaning blade 35 into an engaged position. In some cases it may be necessary to slightly lift the distal end of the pole to actuate the handle pivot assembly. In other examples of the invention, merely pushing the pole in a direction parallel to a central axis of the pole (not shown) is sufficient to cause the latch release arm 30 to contact transition block 74 and lock the cleaning blade 35 into the engaged position.

In some forms of the invention, the actuator assembly 29 is capable of only activating the latch assembly. The pole can be retracted, causing the latch release arm to disengage from the latch assembly, but this action does not cause the cleaning blade 35 to return to the disengaged position. Instead, the operator must manually press reset lever 64 in in a downward position to raise the blade 25. In other embodiments, the operator can return the cleaning blade 25 to the upper position by action of the pole 12.

The removable cleaning pad 42 may be multi-layered and secured together with stitching. The outer layer may contact the glass surface. This outer layer may be formed from microfiber, felt or any other material suitable for wet scrubbing flat, hard surfaces. In some examples of the invention, the cleaning pad 42 may include an abrasive strip portion 42A that is capable of applying greater abrasive forces to the glass surface in the first phase of cleaning. Although the abrasive strip 42A is shown spaced further away from cleaning blade 35 than the microfiber part 42, in some embodiments the positions may be reversed. In one form of the invention, only the microfiber surface is provided. The pad may include one or more absorbent inner layers such as a synthetic felt material, and a top layer that can be any suitable, sun-stable, water absorbent material.

Advantageously, the articulating cleaning blade assembly 33 and the handle pivot assembly are both mounted to the same pivot tube 50. The pivot tube 50 adds rigidity to the pad base 44 and enables the use of a less rigid base, which reduces the cost of the materials to build the tool, and keeps the tool as light as possible. In one embodiment, the pivot tube 50 is formed of magnesium or aluminum alloy with a wall thickness of between 0.035 inch and 0.062 inches.

In some forms of the invention, a plurality of pins 90 extend downwardly from the bottom surface of the base near the opposite ends and are spaced apart such that the pins run up and down the outside edge of the glass panel during cleaning. The pins 90 assure that the head 14 remains parallel to the top and bottom edges of the glass panel during movement, assuring the best cleaning results.

Figure 11:
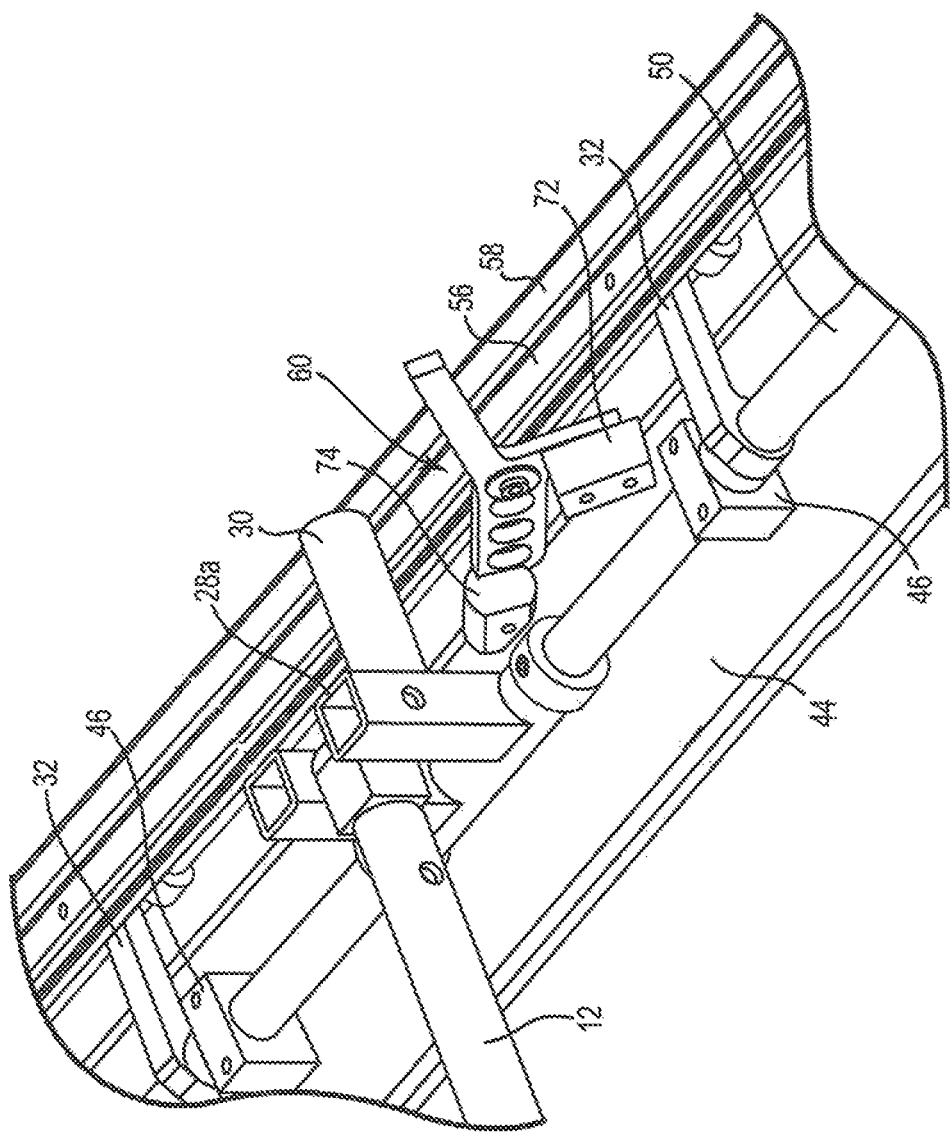
FIG. 11 is a perspective view of the latch assembly in the engaged position with the handle pivot assembly engaged.
Figure 12:
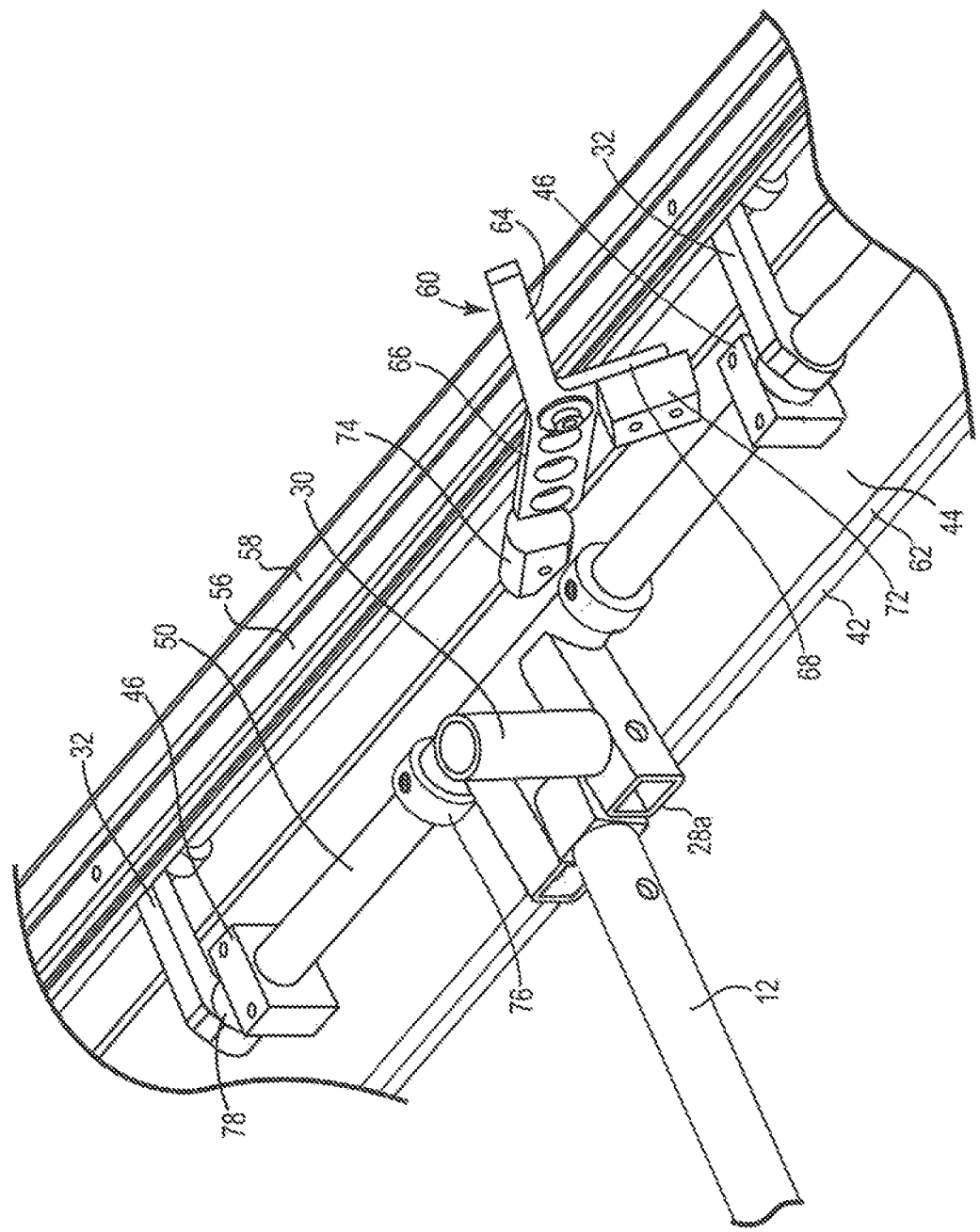
FIG. 12 is a perspective view of the latch assembly in the engaged position and the handle pivot assembly disengaged.

As shown in FIG. 11, the latch assembly 60 is in the engaged position, and the pole 12 has been pushed towards the head 14, causing transition block 74 to drop to the surface of the base, and causing latch release arm to come into contact with an upper surface of weights 56 and 58. In this position, the lower surface of the transition block 74 is resting on the base 44 and the cleaning blade 35 is resting on the glass. As shown in FIG. 12, when the pole 12 is moved in a direction toward the user, the pole 12 is aligned with handle pivot assembly arm side 28a and latch release arm is pointed in an upward direction. However, the cleaning blade 35 remains engaged until the reset lever 64 is pushed downwardly at the end of the second phase of cleaning.

Figure 13:
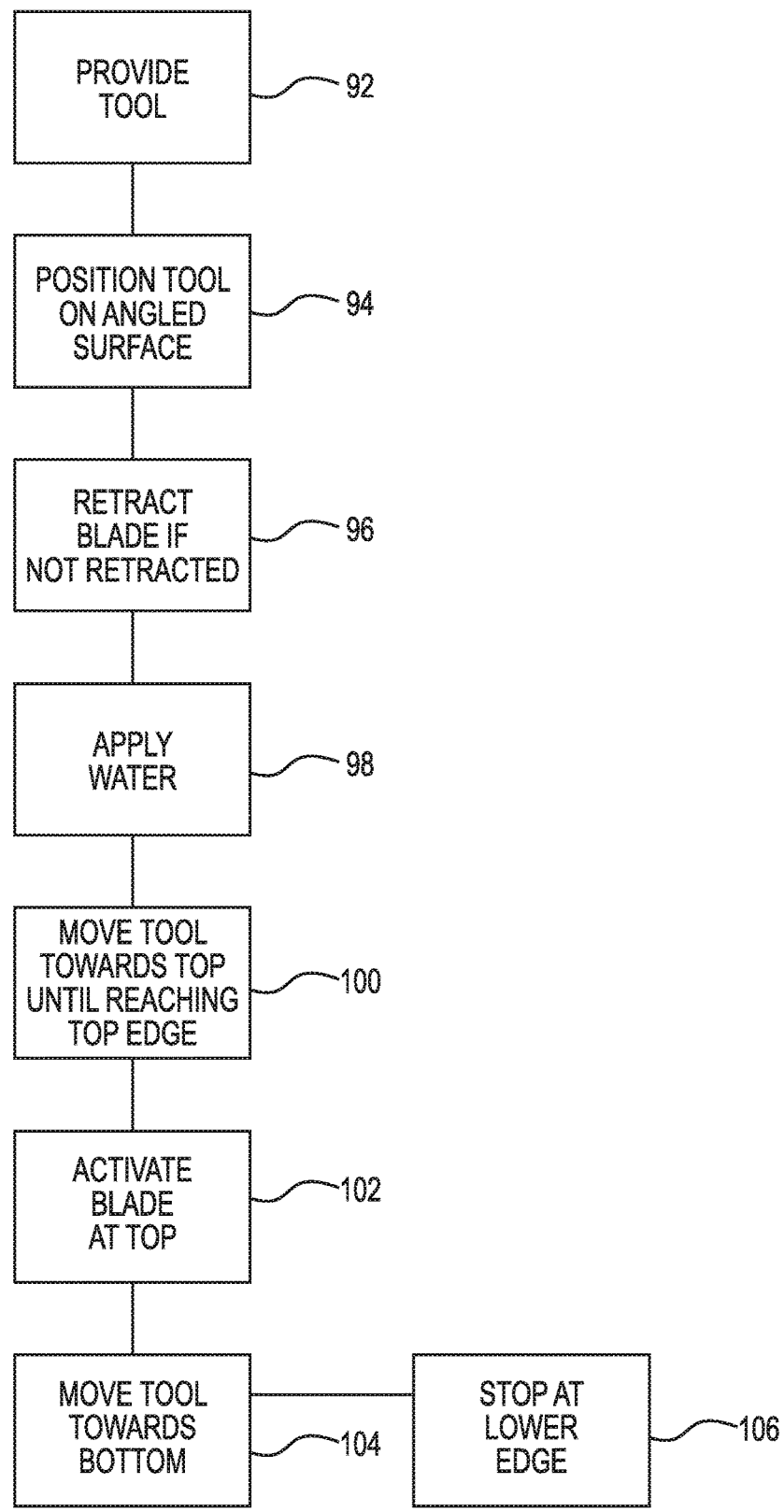
FIG. 13 is a schematic diagram of an exemplary process of the present invention.

A method of cleaning a glass surface of a glass panel is disclosed. Referring to FIG. 13, the method may be used to clean reflective panels of heliostats or other types of solar collectors made from glass, plastics or other known materials. The glass panel to be cleaned has an upper and a lower edge, and the panel is oriented such that the upper and lower edges are substantially parallel with the ground, and the plane of the glass panel surface is positioned at an angle between 35 and 55 degrees from the vertical.

According to the method, a cleaning tool is provided 92. The tool may comprise a cleaning head for supporting a cleaning pad, an articulating cleaning blade assembly, an actuator for moving the cleaning blade into a glass contacting position and a release mechanism for moving the cleaning blade into a glass disengaged position. According to the method, the cleaning head is placed on the surface to be cleaned 94 proximate a lower edge. The surface to be cleaned 94 is at an angle with respect to the horizontal of between 35 and 55 degrees in embodiments. Either before or after placing the cleaning head on the lower edge of the glass, the cleaning blade assembly is moved into the disengaged position 96.

With the glass panel positioned at an angle between about 35 and 55 degrees with respect to the vertical, a small amount of water is applied to the glass surface 98. Preferably a cup of water is tossed across the glass surface so that there is water present across the entire horizontal distance of the glass panel. When the glass panel is about 8 feet wide by about 12 feet tall, for example, only about one twelve (12) ounce cup of water is needed. For other size panels, the amount of water might require adjustment. It is important to apply just enough water to saturate the cleaning pad from end to end.

Next, the cleaning head is moved 100 in a first phase of cleaning towards the top edge, wherein the cleaning pad absorbs the applied water and acts upon the dirt on the surface, until the blade reaches the top edge. The abrasive surface that contacts the glass surface breaks the bonds between the glass and the debris, and the water suspends the debris in the liquid. When the head reaches the top edge, a visual indication of the location of the base may be provided in some embodiments. In one form of the invention, ultra-clean water is used to clean the glass according to methods of the present invention. In other embodiments, tap water or demineralized water may be used. Next the cleaning blade is actuated 102, and in some forms of the invention is rotated into an engaged position. The blade is then moved back down the surface in a direction towards the lower edge 104 removing all liquid and debris, leaving the surface dry. When the tool reaches the lower edge 106, the cleaning cycle is complete.

When the head is near the bottom edge of the glass panel, the operator or operators can grasp the head using the weights as handles, and push the blade 35 over the bottom edge of the glass panel. Either before removing the head from the glass panel or shortly after placing the head on the next panel, the cleaning blade assembly must be disengaged or retracted 96 to ready the device for cleaning the next panel.

Tools of the present invention have greatly improved the efficiency of cleaning glass panels in concentrated solar field plants. Workers can clean up to four times as many panels in the same amount of time as taken using known cleaning methods. The water requirements per panel are decreased from 2-4 gallons to 1 or 2-12 ounce cups, reducing the high cost of demineralized water, the environmental impact from producing too much dirty water, the labor cost of hauling and handling water, the equipment cost of handling larger volumes of water and the cost of removing or trimming overgrown vegetation from the added water. Safety is improved because workers can work safely from the ground and don't need to stand on ladders, operate lift trucks or move platforms. Worker fatigue is reduced and efficiency is increased because tools that require scrubbing action have been replaced with a tool that is pushed up the surface just once, and lowers to the lower edge of the surface with the help of gravity.

Although just one example of a cleaning tool with a retractable cleaning blade has been described in detail, it is to be understood that other configurations that provide an articulated cleaning blade assembly that may be actuated by manipulating the attached pole are contemplated. For example, the device could be configured to raise and lower the blade vertically, and the latch mechanism may be configured to unlatch upon pulling a string to raise the cleaning blade. Other structures may also be used to lower the blade onto the surface to be cleaned.

Cleaning tools of the present invention may be used to clean any flat, smooth surfaces that are oriented at an angle of between 35 and 55 degrees with respect to the vertical, but tools of the invention are particularly suited for concentrated solar applications where the dirty water from cleaning can drip onto the ground without a negative impact. Tools of the present invention could also be configured to clean other types of solar panels, and glass surfaces that are oriented at an angle with respect to the vertical.

It is to be understood that many other structures could be built that fall into the spirit and scope of the present invention. The present invention should not be limited to the examples that have been described above.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A mechanical tool for cleaning a reflective glass surface, comprising:
   a cleaning head, the cleaning head comprising:
      an elongated base member, wherein a first surface of the base member is capable of receiving a cleaning pad;

an articulating cleaning blade assembly comprising a cleaning blade that is pivotally mounted to the base member and positioned proximate an edge of the elongated base member and moveable between a first engaged position that causes the blade of the blade assembly to come into contact with the reflective glass surface and a second disengaged position that causes the blade of the blade assembly to come out of contact with the glass surface;

an actuator mounted to the base and configured to cause the cleaning blade to rotate into the engaged position; and at least one weight, and a plurality of rocker arms, wherein the at least one weight is mounted to the plurality of rocker arms.

2. The mechanical tool of claim 1, and further comprising a pole mounted to the actuator, wherein the actuator is actuated by applying a manual force to the pole.

3. The mechanical tool of claim 1, and further comprising a removable cleaning pad mounted to the first surface of the base.

4. The mechanical tool of claim 3, wherein the removable cleaning pad comprises a multi-layered pad having an absorbent microfiber surface for contacting the reflective glass surface.

5. The mechanical tool of claim 1, wherein the cleaning blade assembly comprises a rigid frame spaced apart from and rotationally mounted to a pivot tube mounted to a second surface of the base member, wherein the cleaning blade assembly further comprises a pliable blade that contacts the reflective glass surface while the cleaning blade is in the first engaged position.

6. The mechanical tool of claim 1, and further comprising a latch release assembly, wherein moving the pole towards the cleaning head causes the latch assembly to move the cleaning blade into the first engaged position.

7. The mechanical tool of claim 1, and further comprising a second weight member to apply a downward force to the cleaning blade while the actuator is rotating the cleaning blade into the engaged position.

8. The mechanical tool of claim 1, and further comprising a cleaning pad mounted to the first surface of the base.

9. A mechanical tool for cleaning a reflective glass surface, comprising:
 a cleaning head, the cleaning head comprising:
  an elongated base member, wherein a first surface of the base member is capable of receiving a cleaning pad;
  an articulating cleaning blade assembly comprising a cleaning blade that is pivotally mounted to the base member and positioned proximate an edge of the elongated base member and moveable between a first engaged position that causes the blade of the blade assembly to come into contact with the reflective glass surface and a second disengaged position that causes the blade of the blade assembly to come out of contact with the glass surface;
  an actuator mounted to the base and configured to cause the cleaning blade to rotate into the engaged position; and
  wherein the elongated base member is substantially rigid, and further comprises a plurality of pivot tube mounts secured to a second opposite surface of the base, and a pivot tube extending through cylindrical bores in the pivot tube mounts such that the pivot tube is spaced apart from the base member and pivots along a central axis of the pivot tube.

10. The mechanical tool of claim 9, wherein the pivot tube mounts are fixedly mounted to the upper surface of the base.

11. A mechanical tool for cleaning a reflective glass surface, comprising:
 a cleaning head, the cleaning head comprising:
  an elongated base member, wherein a first surface of the base member is capable of receiving a cleaning pad;
  an articulating cleaning blade assembly comprising a cleaning blade that is pivotally mounted to the base member and positioned proximate an edge of the elongated base member and moveable between a first engaged position that causes the blade of the blade assembly to come into contact with the reflective glass surface and a second disengaged position that causes the blade of the blade assembly to come out of contact with the glass surface;
  an actuator mounted to the base and configured to cause the cleaning blade to rotate into the engaged position; and
  wherein the reflective glass surface comprises a rectangular panel with a defined width, and further comprising a plurality of guide pins mounted to a lower surface of the elongated base member, spaced apart at a distance wider than the defined width to function as a guide when moving the cleaning head linearly over the surface of the panel.

12. A mechanical tool for cleaning a reflective glass surface, comprising:
 a cleaning head, the cleaning head comprising:
  an elongated base member, wherein a first surface of the base member is capable of receiving a cleaning pad;
  an articulating cleaning blade assembly comprising a cleaning blade that is pivotally mounted to the base member and positioned proximate an edge of the elongated base member and moveable between a first engaged position that causes the blade of the blade assembly to come into contact with the reflective glass surface and a second disengaged position that causes the blade of the blade assembly to come out of contact with the glass surface;
  an actuator mounted to the base and configured to cause the cleaning blade to rotate into the engaged position;
  wherein the cleaning blade assembly comprises a rigid frame spaced apart from and rotationally mounted to a pivot tube mounted to a second surface of the base member, wherein the cleaning blade assembly further comprises a pliable blade that contacts the reflective glass surface while the cleaning blade is in the first engaged position; and
  wherein the actuator comprises a pivotally mounted latch assembly that is moveable into the first engaged position by applying a force to the actuator by at least pushing a pole coupled to the actuator towards the cleaning head.

13. A mechanical tool for cleaning a reflective glass surface, comprising:
 a cleaning head, the cleaning head comprising:
  an elongated base member;
  an articulating cleaning blade assembly comprising a cleaning blade that is pivotally mounted to the base member and positioned proximate an edge of the elongated base member and moveable between a first engaged position that causes the blade of the blade assembly to come into contact with the reflective glass surface and a second disengaged position that causes the blade of the blade assembly to come out of contact with the glass surface; and an actuator mounted to the base and configured to cause the cleaning blade to move between the first engaged position and the second disengaged position, and a plurality of rocker arms coupled to the blade, wherein at least one weight is mounted to the plurality of rocker arms, and where the actuator comprises a pivotally mounted latch assembly that aids in moving the cleaning blade to the first engaged position by applying a force to the actuator towards the cleaning head.

* * * * *